United States Patent [19]
Ray et al.

[11] Patent Number: 5,440,703
[45] Date of Patent: Aug. 8, 1995

[54] SYSTEM AND METHOD FOR SAVING STATE INFORMATION IN A MULTI-EXECUTION UNIT PROCESSOR WHEN INTERRUPTABLE INSTRUCTIONS ARE IDENTIFIED

[75] Inventors: David S. Ray, Georgetown; Alexander K. Spencer, Austin, both of Tex.

[73] Assignee: International Business Machines Corporaiton, Armonk, N.Y.

[21] Appl. No.: 123,816

[22] Filed: Sep. 20, 1993

[51] Int. Cl.⁶ .................... G06F 9/30; G06F 9/38
[52] U.S. Cl. ................... 395/375; 364/231.8; 364/262.4; 364/247; 364/247.6; 364/247.8; 364/DIG. 1
[58] Field of Search ............... 395/375, 725, 425, 650, 395/800; 371/12, 13

[56] References Cited

U.S. PATENT DOCUMENTS

| | | | |
|---|---|---|---|
| 4,385,365 | 5/1983 | Hashimoto et al. | 395/375 |
| 4,589,065 | 5/1986 | Auslander et al. | 395/575 |
| 4,670,835 | 6/1987 | Kelly et al. | 395/575 |
| 4,764,869 | 8/1988 | Miyazaki et al. | 395/375 |
| 4,766,566 | 8/1988 | Chuang | 395/375 |
| 4,901,222 | 2/1990 | Joyce et al. | 395/425 |
| 4,901,233 | 2/1990 | Liptay | 395/375 |
| 4,912,628 | 3/1990 | Briggs | 395/650 |
| 4,942,525 | 7/1990 | Shintani et al. | 395/375 |
| 5,134,561 | 7/1992 | Liptay | 395/425 |
| 5,148,530 | 9/1992 | Joyce et al. | 395/375 |
| 5,159,688 | 10/1992 | Matsushima et al. | 395/725 |
| 5,187,796 | 2/1993 | Wang et al. | 395/800 |
| 5,247,628 | 9/1993 | Grohoski | 395/375 |
| 5,345,567 | 9/1994 | Hayden et al. | 395/375 |

OTHER PUBLICATIONS

IBM TDB, "Fixed-Point/Floating-Point Synchronization", vol. 35, No. 1B, Jun. 1992, pp. 398-399.
IBM TDB, "Approach for Fast Interrupt Response in Processors Using Pipeline Architectures", vol. 32, No. 4A, Sep. 1989, pp. 474-477.
IBM TDB, "Vector Register Allocation", vol. 32, No. 11, Apr. 1990, pp. 282-284.

*Primary Examiner*—Gopal C. Ray
*Attorney, Agent, or Firm*—Mark E. McBurney

[57] ABSTRACT

An apparatus and method provides additional logic in both execution units of a dual execution unit processing in order to determine if the instruction is interruptable. Additionally, backout logic is provided for saving the contents of unique registers. The backout logic uses two decodes to determine if the instruction currently executing modifies the unique registers. It is possible for a single instruction to modify more than one unique register. The backout logic of the present invention resides in both of the execution units and particularly in the unit which contains the unique register being modified by the executing instruction. If an instruction is being executed which modifies one of the unique registers, then the contents of that register are saved in a backout latch. A cancel signal is then provided if the interruptable instruction executes without causing an interrupt. However, if the interruptable instruction does cause an interrupt, then the contents of the backout latch are reloaded into the execution units.

23 Claims, 8 Drawing Sheets

EXAMPLE A: No interrupt from instruction executing on Unit 1.

| Cycle Instruction | Fixed Point Unit 1 | Fixed Point Unit 2 |
|---|---|---|
| Decode | load<br>The load could interrupt | add<br>The decode logic detects the add as a XER modifying op. |
| Execute | load | add<br>The value of the XER register is copied to the BACKOUT register<br><br>The XER register is updated after the execution of the add. |
| Writeback | The load operation does not interrupt. The load data is written to the register file. | The results of the add are written to the register file. |

EXAMPLE B: Interrupt from instruction executing on Unit 1.

| Cycle Instruction | Fixed Point Unit 1 | Fixed Point Unit 2 |
|---|---|---|
| Decode | load<br>The load could interrupt | add<br>The decode logic detects the add as a XER modifying op. |
| Execute | load | add<br>The value of the XER register is copied to the BACKOUT register<br><br>The XER register is updated after the execution of the add. |
| Writeback | The load operation interrupts. The load data is not written to the register file. | The contents of the XER BACKOUT register is written back to the XER register, restoring its state to that before the add instruction. The add results are not written back to the register file. |

FIG. 2

```
E2Y 32G
START TIME: 0    0000000000 1111111111 2222222222 3333333333 4444444444 5555555555 6666666666 7777777777
                 0123456789 0123456789 0123456789 0123456789 0123456789 0123456789 0123456789 0123456789
                 /* Start of Timing Diagram for XER BACKOUT logic
                 /* This signal detects a XER modifying instruction in Unit 2
(1) SOX_FXU_XGC_XER_MOD(0)  ........1...............................
                                    "The XER modifying instruction is detected
                                     in the execute cycle (17).
(2) SOX_FXU_XGA.L_XER_MOD(0) ...........11.1111111111........      /* This signal is then latched to delay it to the writeback cycle  */
                                       "The modifying instruction decode is
                                        latched to see if a interrupt occurs.
                             /* The next two signal control which data is used the XER or the BACKOUT
                              ...    The XER is always selected since
(3) SOX_FXU_XGA.XER_SL_(0)   ...........11 1111111111 11.           no interrupt occurs.  */
(4) SOX_FXU_XGA.XER_BAK_SL_(0) ...........11 1111111111 11.

/* These signals indicate instructions executing on Unit 1 during the EXECUTE cycle  */
(5) SOX_FXU_.XGA.HOLD_EX0(0) 1111111111 1111111.11 1111111111 11.
(6) SOX_FXU_.XGA.HOLD_EX0(1) 1111111111 1111111.11 1111111111 11.
                                       "The load executes on Unit 1
                                        in cycle 17.

/* These signals indicate instructions executing on Unit 2 during the EXECUTE cycle  */
(7) SOX_FXU_.XGA.HOLD_EX1(0) 1111111111 1111111.11 1111111111 11.
(8) SOX_FXU_.XGA.HOLD_EX1(1) 1111111111 1111111.11 1111111111 11.
                                       "The add executes on Unit 2 in cycle 17.
```

FIG. 5A

```
(9)  SOX_FXU_XJH_FX_CANCEL(0)    /* This signal tell us if the instruction in unit 1 actually caused and interrupt
                                     ................  No interrupt occurs.                                        */

/* These next three signals are the contents of the XER register
(10) SOX_FXU_XGA_XER_(0)            ..........  .11111111  1111111111   11.
(11) SOX_FXU_XGA_XER_(1)            ..........  .111111..  ............   ...
(12) SOX_FXU_XGA_XER_(2)            ..........  .111111..  ............   ...
                                                       "The XER register now contains the
                                                        new value from the add instruction.

/* The next three signals are the contents of the BACKOUT XER register            */
(13) SOX_FXU_XGA.SO_BACK(0)         ..................  .111  111111111  11.
(14) SOX_FXU_XGA.OV_BACK(0)         ..................  .111  111111111  11.
(15) SOX_FXU_XGA.CA_BACK(0)         ..................  .111  111111111  11.
                                                       "The XER register contents are
                                                        saved in the BACKOUT register /* End of Timing Diagram for XER BACKOUT logic
```

FIG. 5B

SYSTEM AND METHOD FOR SAVING STATE INFORMATION IN A MULTI-EXECUTION UNIT PROCESSOR WHEN INTERRUPTABLE INSTRUCTIONS ARE IDENTIFIED

BACKGROUND OF THE INVENTION

1. Field of the Invention

The present invention relates to computer processing systems having dual execution units. More specifically, logic is provided that allows a second execution unit to operate even when interruptable instructions are executing on the first execution unit.

1. Description of Related Art

Conventionally, in a dual execution unit processing system, when an interruptable instruction is encountered on a first execution unit, the second unit is held off until that instruction executes. Since, many common instructions can potentially cause interrupts, the performance of the processing system is degraded if instructions executing on the second execution unit are held depending on whether the instructions executing on the first unit causes an interrupt.

In a dual execution unit processor design, it is often necessary to cancel the second instruction that has just executed. Reasons for cancelling this instruction may be the occurrence of an interrupt which is caused by the execution of the first instruction. Interrupts may occur due to a "page fault" occurrence, (i.e. a page is not in memory), or because of a trap type interrupt. Since both instructions execute in the same machine cycle, the second instruction may have altered an architected register, i.e. one that is capable of being altered by the software, which must now be restored to its previous state. For example if a load instruction is executing in the first execution unit and an add instruction with overflow enable is executing in the second unit, and the load causes an interrupt, the bits set by the add instruction in the fixed point exception register (XER) must be restored to their previous values, because the add instruction must be cancelled due to the interrupt.

Thus, the problem is restoring the modified contents of architected registers in a multi-execution unit design when the instruction executing in the second execution unit is cancelled, due to a side effect caused by the execution of the first instruction executing in the first execution unit. It can be seen that this problem does not exist with architected registers that are modified during the write back cycle (not the execution cycle) because the interrupt is known during write back. Therefore, if an actual interrupt is generated during the execute cycle, the contents of these registers will contain the machine state as it was prior to the interrupt. This is because the actual interrupt is not identified until the write back cycle, such that update of the registers which are normally updated during the write back cycle is prevented. Thus, the contents of these registers will not be modified during the write back cycle. While those registers that are updated during the execute cycle will have to be restored.

IBM Technical Disclosure Bulletin, volume 35, no. 1B, June 1992, Page 398-399 discusses a multiple execution unit processor including a counter that tracks how many floating point unit (FPU) instructions have moved beyond the final stage of the fixed point unit (FXU) pipeline. The counter is incremented when an instruction that was also sent to the FPU moves beyond the final stage of the FXU and is decremented when the FPU completes an instruction. The system only allows the FPU to complete an instruction when the counter has a value greater than zero such that instructions are prevented from finishing.

IBM Technical Disclosure Bulletin, volume 32, no. 4A, September 1989, page 474, describes a system for fast interrupt response in pipelined processors. An interrupt state register (ISR) is used in the data flow that makes all instructions transparent to interruption. The ISR is an additional register which, in addition to status registers saves pipeline state parameters which are restored at the end of interrupt service by inclusion of a RESTORE instruction.

U.S. Pat. Nos. 5,148,530 and 4,901,222 describe a method of executing instructions by altering an address in a system with a virtual memory addressing scheme. The virtual address is incremented or decremented during the read out cycle of the previous operand. If the operand is not in physical memory, then the content of a base register is restored to its original value. This system backs out a software instruction after execution has begun.

U.S. Pat. No. 4,766,566 generally describes a processing system with dual special purpose execution units. U.S. Pat. No. 4,912,628 is a virtual machine system that includes a special program which provides suspend and resume control functions. This program seizes control of the machines external interrupt controls and directs all incoming interrupts to the program itself, rather than allowing the virtual machine to handle the interrupts. The machine is later restored to operation and the user's task is resumed from its interrupted point by restoring all register content. U.S. Pat. No. 4,589,065 performs a storage address validity check in a single cycle, in the event that trap exception does not cause an interrupt. If an interrupt does occur, more cycles will be needed.

It can be seen that none of these conventional systems include a general purpose dual execution unit processing system that determines if an instruction in the second execution unit modifies architected registers in the execute cycle and provides backup logic for restoring these registers should an interrupt be caused by instruction on first unit.

SUMMARY OF THE INVENTION

In contrast to the prior art, the present invention determines if the instruction to be executed on the first execution unit is one that is interruptable, if so, and if the instruction to be executed on the second execution unit modifies an architectural unique register, a backout operation may be performed to maintain the state of these unique registers. These registers are updated during the execute cycle of the pipeline, in contrast with the register file which is updated during the write back cycle. Since, it is unknown during the execute cycle whether the interruptable instruction actually caused an interrupt signal to be generated, the contents of these registers must be saved. This will allow the instructions in the second execution unit to continue executing without having to be held waiting to see if the interruptable instruction did cause an interrupt to occur.

Broadly, the present invention provides additional logic in both of the execution units to determine if a backout condition could occur. The backout logic for the unique registers uses two decodes to determine if the instruction currently executing modifies the unique registers. It is possible for a single instruction to modify more than one unique register. The backout logic of the present invention resides in both execution units, but particularly in the execution unit which contains the respective unique register being modified by the executing instruction. If an instruction is being executed which modifies one of the unique registers, then the contents of that register are saved in a backout latch. A cancel signal is then provided if the interruptable instruction executes without causing an interrupt. However, if the interruptable instruction does cause an interrupt, then the contents of the backout latch are reloaded into the unique registers. It can be seen that if no backout system was provided, then only a single interruptable instruction could be dispatched at a time. This would be a severe performance penalty for a dual execution unit design, since all load and store instruction can cause interrupts. Thus, by using the present invention both instructions are executed on both execution units independent of whether the instructions are interruptable.

Therefore, in accordance with the previous summary, objects, features and advantages of the present invention will become apparent to one skilled in the art from the subsequent description and the appended claims taken in conjunction the accompanying drawings.

BRIEF DESCRIPTION OF THE DRAWINGS

FIG. 2 is a chart which provides examples of the operation of the present invention when an interrupt does not occur (example A) and an interrupt actually does occur, based on an instruction in execution unit 1 (example B);

FIG. 5 is another timing diagram corresponding to FIG. 4 and showing the actual binary signals used to backout the XER and MQ registers.

DETAILED DESCRIPTION OF THE PREFERRED EMBODIMENTS

Figure 1:
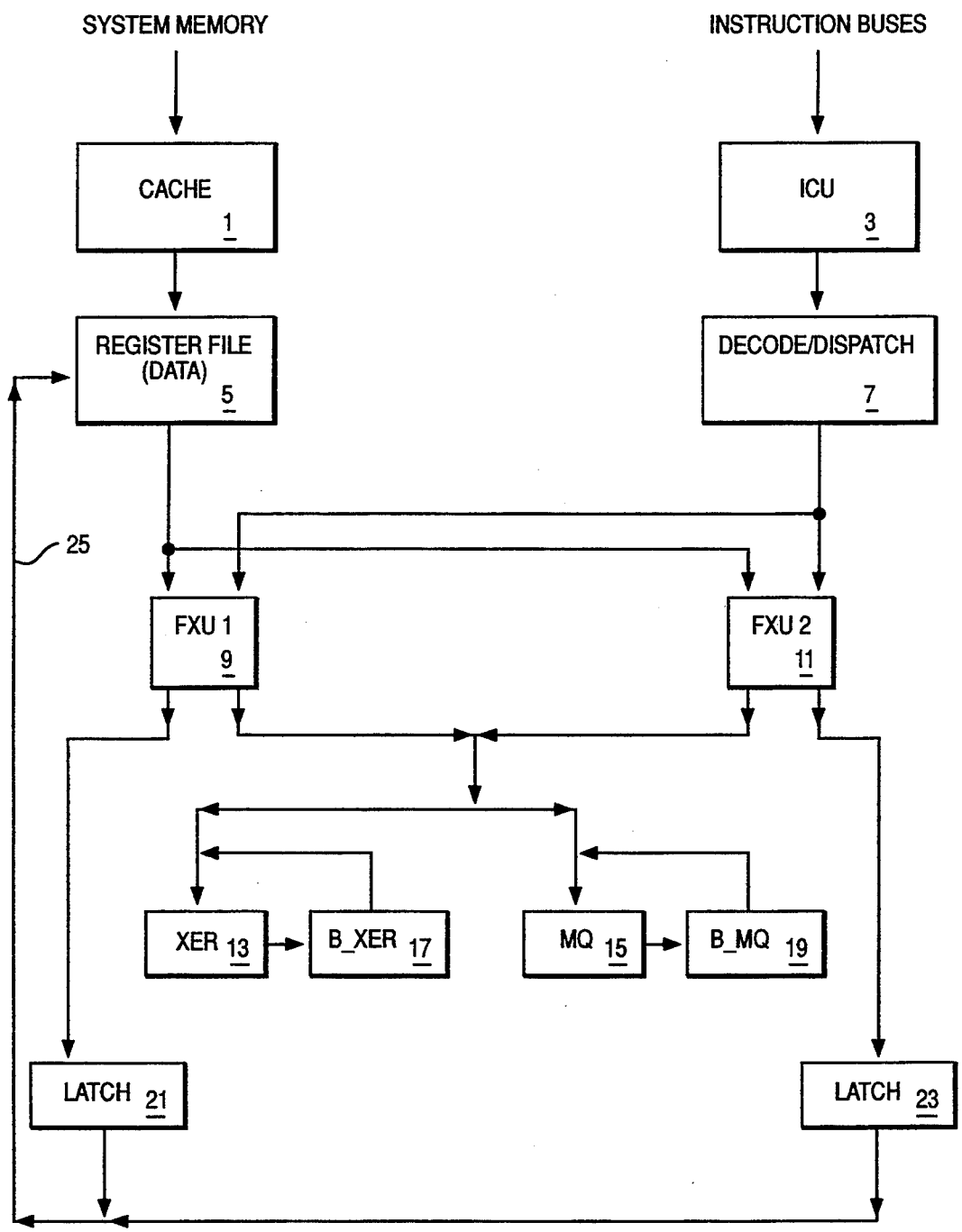
FIG. 1 is a block diagram showing the components of a dual execution processing unit system of a preferred embodiment of the present invention.

Referring to FIG. 1, a block diagram of a dual processor system of the present invention is shown. System memory is connected to a cache 1 which transfers data from the system memory (not shown) to a register file 5. The data in register file 5 is then provided to dual fixed point unit 9 and 11.

Instructions are provided into an instruction cache unit 3 from instruction buses (not shown). These instructions are then decoded and dispatched by decode unit 7. Once the instructions are decoded, they are provided to a respective one of fixed point unit 9 or 11 for manipulating the data provided thereto from the register file 5, as previously noted. Fixed point units 9 and 11 then execute the instructions received from decode/dispatch unit 7 and manipulate the data provided by register file 5. The output data is then provided to general purpose latches, (21 and 23) for providing the data back to register file 5 to again be manipulated by another instruction, e.g. an add instruction, or the data may be provided to translation logic (not shown) which translates a previously calculated effective address for the data being manipulated to a physical location in system memory (or cache 1). The data is then stored to the memory at the translated physical address. Thus, data output from fixed point units 9 and 11 is either returned to the register file 5 for further processing or stored in system memory (including cache 1).

Also shown in FIG. 1 is a fixed point exception register (XER) 13 and a multiple quotient (MQ) 15 registers. The XER and MQ registers are both architectural unique registers which are updated during the execution cycle of the pipeline. Thus, unlike register file 5, which is updated during the writeback cycle along bus 25, the XER and MQ registers are modified when the instruction is executing. The fixed point exception register is a 32 bit register having bit definitions based on the operation of an instruction considered as a whole, not on intermediate results. Generally, the XER register holds overflow and carry states for arithmetic operations. For example, the result of a subtract from carrying (SUBFCX) instruction is specified as the sum of three values. This instruction sets bits in the XER based on the entire operation, not on an intermediate sum. Zero bit in XER is a summary overflow bit that is set whenever an instruction sets the overflow bit to indicate overflow and remains set until cleared by the software. Bit 1 is the overflow bit and is set to indicate that an overflow has occurred during execution of an instruction. Add and subtract instructions may set the overflow bit to logical 1 if the carry out of bit 0 is not equal to the carry out of bit 1. Otherwise, the overflow bit is cleared. Bit 2 is the carry bit which is generally set to indicate that a carry out of bit 0 occurred during execution of an instruction. Add carrying, subtract from carrying, add extended, and subtract from extended instruction set carry bit to logical 1 if there is a carry out of bit 0 and clear it otherwise. Bits 3–15 are reserved. Bits 16–23 is a field that contains the byte to be compared by load string and compare byte instruction. Bit 24 is reserved and bits 25–31 is a field which specifies the number of bytes to be transferred by a load string word index or store string word index instruction.

The multiply quotient register is a 32 bit register used as a register extension to accommodate the product for the multiply instriction and a dividend for the divide instruction. It is also used as an operand of long, rotate and shift instructions. It may be modified during the execution of various instructions including MULI, MULS, DIVS, DIVU, or the like, which are implementation specific. The value written to the MQ register during these operations is operand dependent and therefore contents of the MQ register may become undefined after any of these instructions execute. Other instructions such as multiply, divide, shift left, shift right, and the like, also modify the MQ register. The move to special purpose register and move from special purpose register can access the MQ register as well.

Additionally, backup registers 17 and 19 (B_XER and B_MQ) are included in the present invention which are non-architected latches for storing a copy of the contents of the XER and MQ registers 13, 15, respectively. As noted previously, the XER and MQ registers are updated during the execute cycle. Therefore, if an interrupt occurs and the contents of these registers are not stored, then the processor cannot be returned to the state it was in at the time the instruction causing the interrupt executed. It should be noted that all other special purpose and general purpose registers are updated during a writeback cycle, which is subsequent to the execute cycle, and if an interrupt is received, these registers will contain the same contents which were present during execution of the instruction which caused the interrupt. The backup XER 17 and backup MQ 19 will restore the XER and MQ registers to their state at the time the instruction which caused the interrupt is executed.

Conventional systems, will lock the second execution unit, e.g. 11, when an interruptable instruction is encountered on the first execution unit 9. This will cause the instructions to execute in order, but does not fully utilize the capability of a dual execution unit system. Furthermore, load and store instructions are interruptable and are some of the more frequently encountered instructions such that the second execution unit is locked for a large amount of time, thus defeating the purpose of a dual execution unit system. Therefore, the present invention provides backup logic in both execution units 9 and 11 which recognize interruptable instructions and enable backup latches 17 and 19 to accept contents of their respective registers 13 and 15. These registers are backed up when an instruction that executes on fixed point unit 9 is an interruptable instruction, and the instruction on FXU 11 modifies the contents of XER and MQ registers 13 or 15. In this case, the backup logic (FIG. 2) places a copy of the content of these registers into the backup latches 17 and 19 and if an interrupt does in fact occur, this data is then used to restore the XER and MQ registers to the state they were in when instruction causing the interrupt executed. If, the interruptable instruction did not in fact cause an interrupt, then the data is merely held in the backup latches 17 and 19 until another interruptable instruction is encountered and the contents of the XER and MQ registers at that time are then stored in the backup latches 17 and 19.

The backout logic of the present invention is included in fixed point units 9 and 11. The backout logic for the XER and MQ registers begins with decode operations in the second execution unit 11. The decodes determine if the instruction currently executing modifies the XER or the MQ register. It should be noted that it is possible to have one instruction which modifies both, for example, an MULO instruction. The remainder of the logic for the MQ backout is contained in the second execution unit, since the MQ register is part of the data flow, while the XER backout logic is contained in the first execution unit since the XER register is found there.

The MQ backup logic determines if an MQ modifying instruction is executing on the second execution unit and if so, the contents of the MQ register is saved to the MQ backup latch 19. If in the following cycles an FX_CANCEL signal becomes active, (indicating an interrupt condition occurred) and the latched MQ modifying decode is still set, then the MQ register is reloaded with the contents of the MQ backout latch. The MQ modifying decode latch is held so that the FX_CANCEL can become active several cycles later and still restore the MQ register.

The XER backup logic is set if an XER modifying instruction is executing in the second execution unit. This latch is held if both execution units are held, otherwise the latch is reset. Three bits of the XER register are saved in the XER backout latch 17. If the FX_CANCEL signal becomes active and the latched XER modifying decode is still set, then three bits of the XER register are reloaded with the contents of the XER backout latch 17. It should be noted that if, in the previous cycle, an instruction on the second execution had set the SO bit of the XER, this condition would not yet be reflected in the state of the XER and thus, the SO data latch from the second execution unit into the XER backout latch, must be bypassed.

FIG. 2 is a diagram including two examples which illustrates the present invention. In the first example A, the situation is illustrated where an interrupt from an instruction executing on unit 1 does not actually occur. During the decode cycle the load instruction is provided to execution unit 1 and an add instruction is in execution unit 2. The decode logic determines that the load instruction provided to execution unit 1 is interruptable and the add instruction in execution unit 2 will modify the XER register. The load instruction is the executed on unit 1 and the add instruction on execution unit 2 during the execute cycle. Because the decode logic determines that the add instruction modifies the XER register, the value of the XER register is copied to backout XER latch 17 and the XER latch is updated with the data value corresponding to the add subsequent to the execution of the add instruction on unit 2. During the write back cycle it is determined that the load instruction executed on unit 1 did not cause an interrupt and the load data is then written to register file 5. Additionally, the results of the add instruction on unit 2 are written to register file 5. A restore or "backout" operation is not required in this case.

Example B illustrates the situation wherein the instruction executing on unit 1 does in fact cause an interrupt to occur. Again, the decode logic determines that the load instruction on unit 1 could interrupt and the add instruction on unit 2 will modify the XER register. During the execute cycle the load is executed by unit 1. The add instruction is executed by unit 2 with the value of the XER register being copied to the backout register. During the write back cycle it is then determined that the load operation executed by unit 1 did in fact cause an interrupt to occur. Therefore, the load data is not written to register file 5. Since the interrupt did occur, the content of the XER backout latch 17 are written back to the XER register 13 restoring this register to the state it was in prior to execution of the add instruction. It can be seen that since the register file is updated during the write back cycle there is no need to backout these values since it is known whether an interrupt actually occurred prior to update of the register file and the update can be prevented. This is not the case with MQ and XER registers since they are updated during the execute cycle, therefore, the backout logic is required in order to save the contents of the MQ and XER registers at the state they were in prior to the execution of the instruction on unit 1 which caused an interrupt.

Figure 3A:
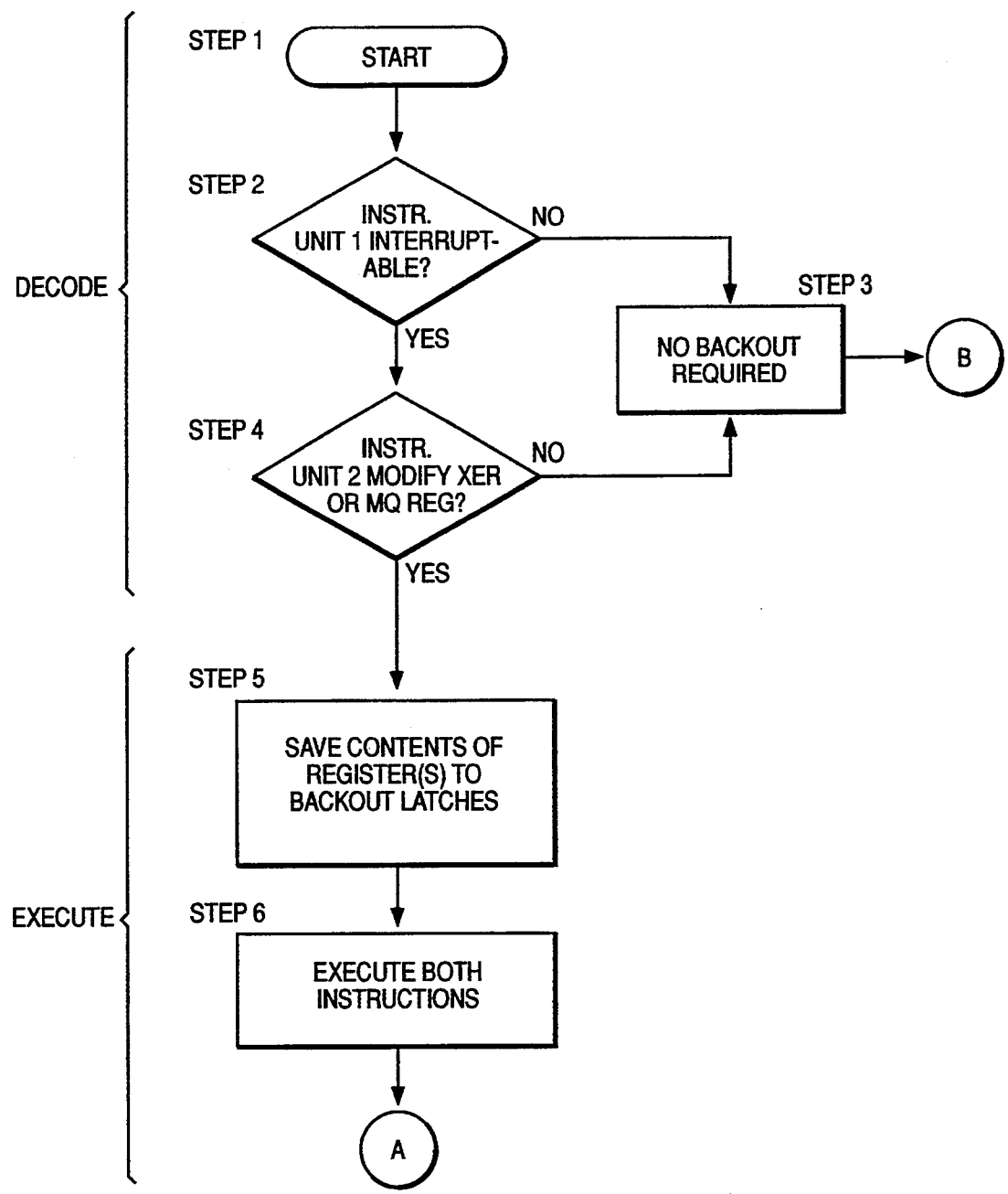
FIGS. 3a and 3b is a flow chart illustrating the steps used by the present invention to backout the instructions in the unique registers.
Figure 3B:
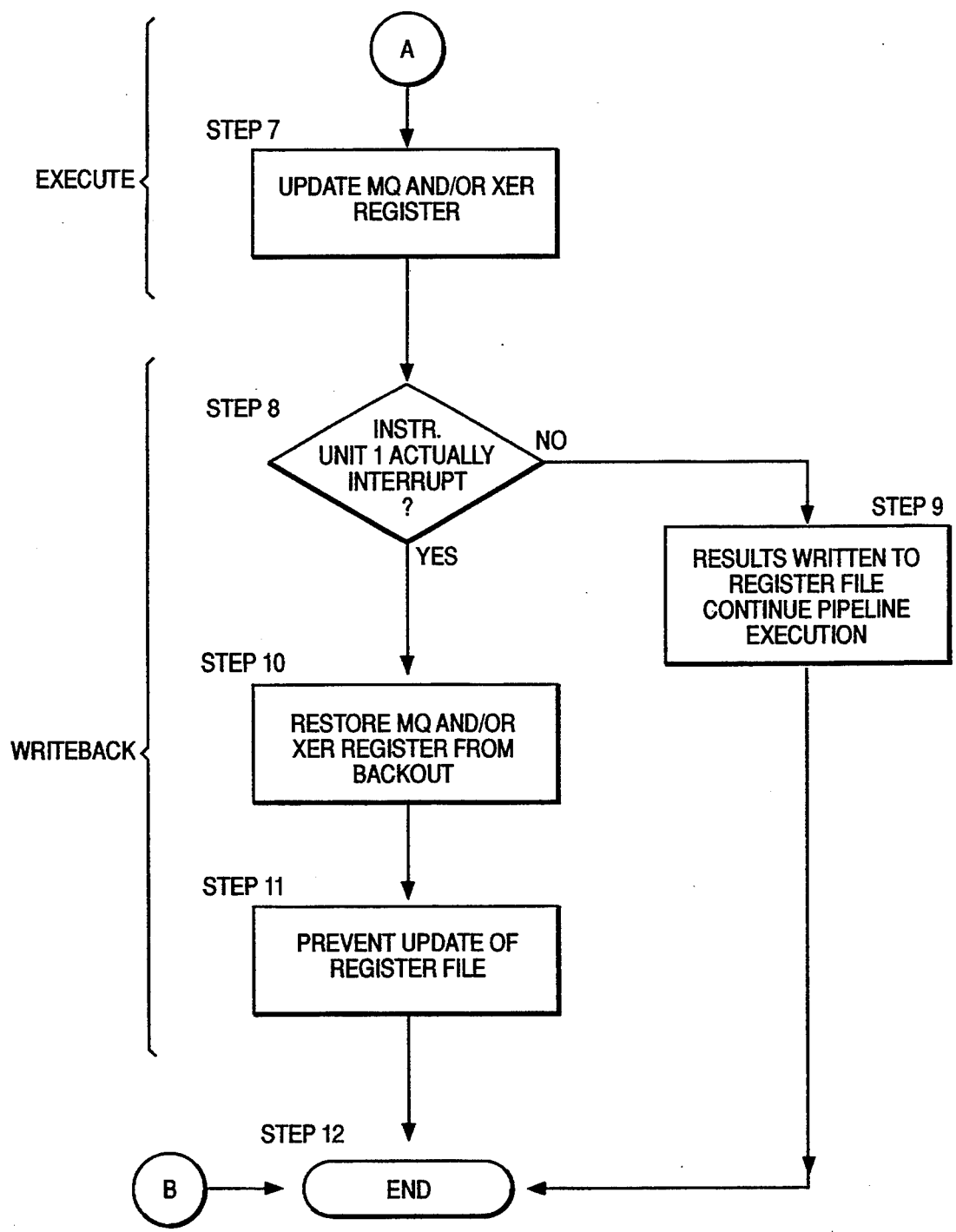

The flowchart of FIGS. 3a and 3b will now be described wherein the process started at step 1 and step 2 determines whether the instruction provided to execution unit 1 is in fact interruptable. If not, the process continues to step 3 since no backout is required and on to step 12 and ends. If it is determined by the decode logic in step 2 that the instruction unit 1 is in fact interruptable, then the decode logic determines at step 4 if the instruction in unit 2 modifies either the XER or MQ registers. If the instruction unit 2 does not modify either of these registers, then there is no backout required and the process continues to step 3 and ends at step 12.

However, if it is determined at step 4 that the instruction in unit 2 does modify the XER or MQ register, then the contents of these registers are saved to backout latches 17 and 19 at step 5. At step 6 both of the instructions in in executing units 1 and 2 are executed and the MQ and/or XER registers are updated with values from the instruction executing on unit 2 (step 7). During the write back cycle it is then determined, at step 8, if the instruction that executed on unit 1 actually caused an interrupt to occur. If no interrupt occurred, the process continues to step 9 where the data resulting from the instructions executing on units 1 and 2 are written to the register file 5 and the pipeline execution of instructions continues. Subsequent to step 9 the process ends at step 12.

If in fact it is determined that the instruction executing on unit 1 did cause an interrupt to occur, step 10 restores the MQ and/or XER register from backout latches 17 and 19 to their state prior to execution of the instruction on unit 1 which caused the interrupt. At step 11, the register file is prevented from being updated with the data corresponding to the instruction which executed on unit 1 and caused the interrupt. Subsequent to step 11, the process ends at step 12.

The previous description relates to a single segment of the instruction pipeline, however, those skilled in the art will understand that steps 1–12 will be implemented for each stage of the pipeline for instructions that are provided to the execution units 1 and 2.

Figure 4A:
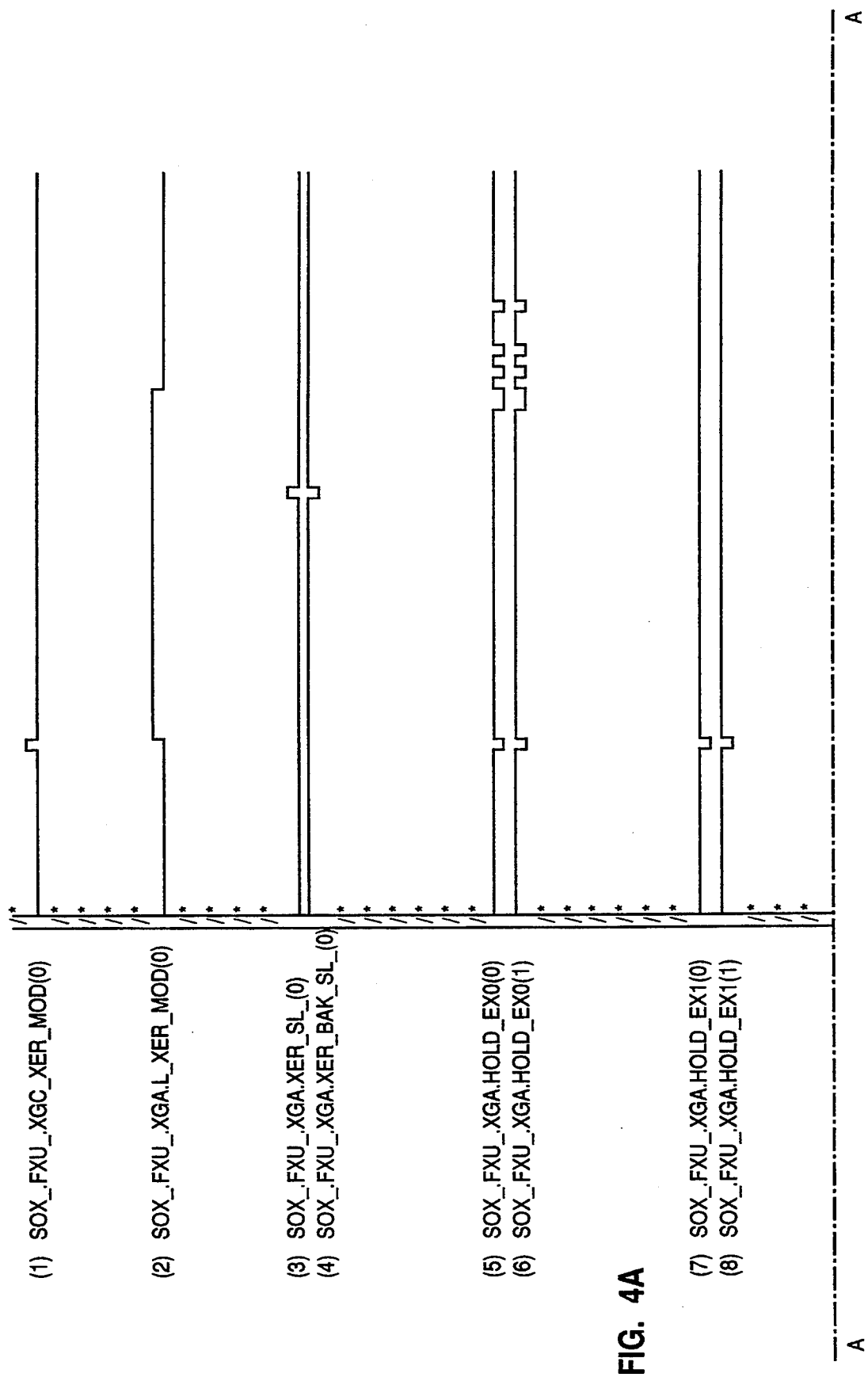
FIG. 4 is a timing diagram showing the actual control signals and their sequence which are used to implement the present invention.
Figure 4B:
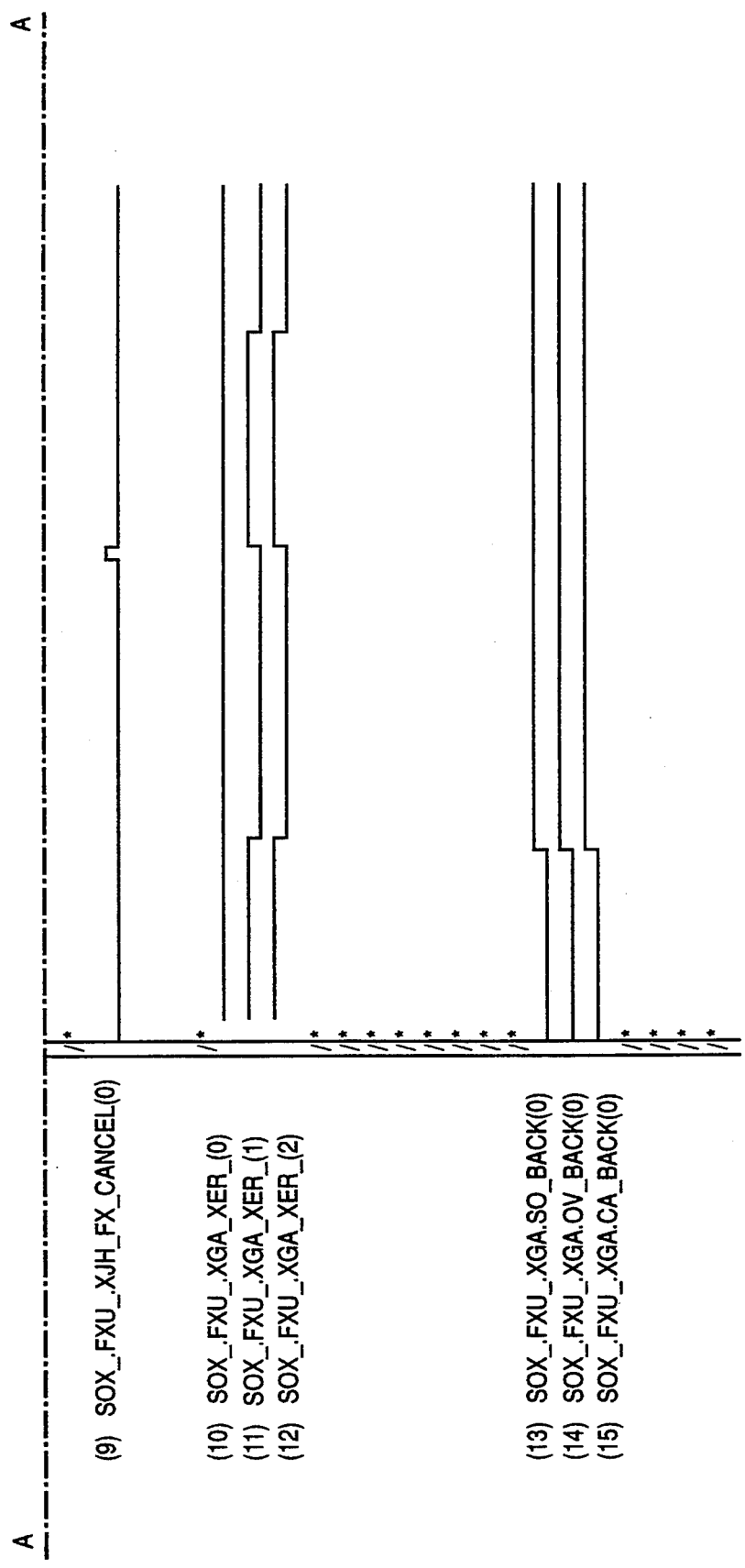

FIG. 4 is a timing diagram showing the actual control signals and their relationships to one another as used in accordance with the present invention. Signal 1,SOX─.FXU─.XGC─XER─MOD(O) is the signal which detects an instruction in execution unit 2 which modifies the XER register 13. This signal is issued by decode logic 7 and detected by the backout logic of the present invention during the execute cycle. Control signal 2, SOX─.FXU─.XGA.L.─XER─MOD(O) is a latched copy of control signal 1 and saved so that it will be available if an interrupt does in fact occur. Control signal 3, SOX─.FXU─.XGA.XER─SL─(O), and control signal 4, SOX─.FXU─.XGA.XER─BAK─S-L─(O), are used to determine whether the data is in the XER register, or the backout register. The present invention always selects the XER register since no interrupt will occur on unit 2. Control signals 5 and 6, SOX─.FXU─.XGA.HOLD─EXO(O) and SOX─.FXU─.XGX.HOLD─EXO(1), respectively, indicate a stall of execution unit 0 and 1 respectively. The first transition of these signals (5 and 6) indicates that the instruction on unit 1 has executed. The next 3 transitions of these signals (5 and 6) show the interrupt handler has executed indicating that an interrupt has in fact occurred.. The last transition of these signals occurs when the instruction in execution unit 2 (an add instruction using the example of FIG. 2) is re-executed. Control signal 9, SOX─.FXU─.XJH─FX─CANCEL(O) provides an indication to the backout logic of the present invention as to whether the instruction in execution unit 1 actually caused an interrupt. This signal will become active when an interrupt does occur. Control signals 10, 11 and 12 (SOX─.FXU─.XGA─XER(O) SOX─.FXU─.XGA─XER(1) and SOX─.FXU─.XGA─XER(2), respectively) provide the contents of the XER register to be backed out. The trailing edge of the deactivation of signals 11 and 12 indicates that the XER register now contains the new value from the instruction executed by unit 2. The leading edge of the activation of signals 11 and 12 indicates that the XER register has been restored with the previous value and the interrupt handler will see the correct state of the XER register. The second trailing edge of the activation of signals 11 and 12 shows that the XER register is set to the value from the instruction executing on unit 2 once this instruction has been re-executed. Control signals 13, 14 and 15 (SOX─.FXU─.XGA.SO─BACK(O), SOX─.FXU─.XGA.OV─BACK(O), SOX.─.FXU─.XGA.─CA─BACK(O), respectively) are control signals corresponding to the content to the backout XER latch 17. These signals show that the XER register contents have been saved and to the backout latch. It should be noted that FIG. 4 has been described with reference to the XER register, however, those skilled in the art will understand that control signals performing the identical functions will be utilized to backout the contents of the MQ register 15.

FIG. 5.is a timing diagram which is similar to FIG. 4, but also shows binary signals utilized by the logic of the present invention, wherein the periods indicate logical 0's, and 1's indicate a logical 1. Again, control signals 1–15 are shown which are utilized to implement the backout function of the present invention.

It can be seen that by detecting those instructions which can modify the machine state during the execute cycle and providing a mechanism for backing out these instructions processor performance is greatly enhanced. In conventional systems, if an interruptable instruction is encountered on a first execution unit, the second unit may be held off (sit idle) until the interruptable instruction executes. Since there are a great number of different instructions which are interruptable, there will be numerous instances where the second execution unit is sitting unused. In contrast, the present invention backs up the state of registers modified by instructions concurrently executing on the second unit. This allows the second execution unit to be utilized a higher percentage of the time, rather then sitting idle when interruptable instructions are encountered on the first unit. This provides a distinct processing advantage since a large number of instructions, e.g. loads, are interruptable.

Although certain embodiments have been shown and described, i( will be understood that many changes and modifications may be made therein without departing from the scope of the appended claims.

We claim:

1. A method for selectively saving a state of a multi-execution unit processing system based on a specific type of instruction to be executed, comprising the steps of:

determining, prior to execution, if a first instruction is interruptable;

determining if a second instruction to be executed concurrently with said first instruction modifies a register which is updated during the execution cycle;

saving a content of said register when said first instruction is interruptable and said second instruction modifies said register; and restoring said register with said content upon the occurrence of an interrupt.

2. A method according to claim 1 further comprising the step of executing said first and second instructions on a first and second execution unit, respectively.

3. A method according to claim 2 wherein said step of executing comprises the step of modifying said register with a new value resulting from the execution of said first and second instructions.

4. A method according to claim 3 wherein said step of restoring comprises the step of determining whether said interruptable first instruction actually caused an interrupt to occur.

5. A method according to claim 4 wherein said step of restoring further comprises the step of placing the saved contents into said register thereby restoring said register to a state prior to execution of said first and second instructions.

6. A method according to claim 5 further comprising the step of preventing other registers, updated subsequent to said execution cycle, from being updated with results corresponding to the execution of said first and second instructions if an interrupt actually occurs.

7. A method according to claim 6 further comprising the step of updating said other registers with results corresponding to the execution of said first and second instructions if an interrupt does not occur.

8. A method according to claim 5 further comprising the step of re-executing said first and second instructions if an interrupt does actually occur.

9. A system that selectively saves a state of a multi-execution unit processing system based on a specific type of instruction to be executed, comprising:
means for determining, prior to execution, if a first instruction is interruptable;
means for determining if a second instruction to be executed concurrently with said first instruction modifies a register which is updated during the execution cycle;
means for saving a content of said register when said first instruction is interruptable and said second instruction modifies said register; and
means for restoring said register with said content upon the occurrence of an interrupt.

10. A system according to claim 9 further comprising means for executing said first and second instructions.

11. A system according to claim 10 wherein said means for executing comprises means for modifying said register with a new value resulting from the execution of said first and second instructions.

12. A system according to claim 11 wherein said means for restoring comprises means for determining whether said interruptable first instruction actually caused an interrupt to occur.

13. A system according to claim 12 wherein said means for restoring further comprises means for placing the saved contents into said register thereby restoring said register to a state prior to execution of said first and second instructions.

14. A system according to claim 13 further comprising means for preventing other registers, updated subsequent to said execution cycle, from being updated with results corresponding to the execution of said first and second instructions if an interrupt actually occurs.

15. A system according to claim 14 further comprising means for updating said other registers with results corresponding to the execution of said first and second instructions if an interrupt does not occur.

16. A system according to claim 15 further comprising means for re-executing said first and second instructions if an interrupt does actually occur.

17. A system according to claim 9 wherein said means for determining if a first instruction is interruptable and said means for determining if a second instruction modifies a register comprise a decode circuit included in a central processing unit.

18. A system according to claim 17 wherein said means for saving comprises a backout latch.

19. A method for selectively saving a state of a multi-execution unit processing system based on a specific type of instruction to be executed, comprising the steps of:
determining, prior to execution, if a first instruction is interruptable;
determining if a second instruction to be executed concurrently with said first instruction modifies a register updated during the execution cycle;
saving a content of said register when said first instruction is interruptable and said second instruction modifies said register;
restoring said register with said content upon the occurrence of an interrupt by determining whether said interruptable first instruction actually caused an interrupt to occur and placing the saved contents into said register to restore said register to a state prior to execution of said first and second instructions;
executing said first and second instructions on a first and second execution unit, respectively, by modifying said register with a new value resulting from the execution of said first and second instructions; and preventing other registers, updated subsequent to said execution cycle, from being updated with results corresponding to the execution of said first and second instructions if an interrupt actually occurs.

20. A method according to claim 19 further comprising the step of updating said other registers with results corresponding to the execution of said first and second instructions if an interrupt does not occur.

21. A system that selectively saving a state of a multi-execution unit processing system based on a specific type of instruction to be executed, comprising:
means for determining, prior to execution, if a first instruction is interruptable;
means for determining if a second instruction to be executed concurrently with said first instruction modifies a register updated during the execution cycle;
means for saving a content of said register when said first instruction is interruptable and said second instruction modifies said register;
means for restoring said register with said content upon the occurrence of an interrupt by determining whether said interruptable first instruction actually caused an interrupt to occur and placing the saved contents into said register to restore said register to a state prior to execution of said first and second instructions;
means for executing said first and second instructions on a first and second execution unit, respectively, by modifying said register with a new value resulting from the execution of said first and second instructions; and
means for preventing other registers, updated subsequent to said execution cycle, from being updated with results corresponding to the execution of said first and second instructions if an interrupt actually occurs.

22. A system according to claim 21 further comprising means for updating said other registers with results corresponding to the execution of said first and second instructions if an interrupt does not occur.

23. A system according to claim 22 further comprising means for re-executing said first and second instructions if an interrupt does actually occur.

* * * * *